(12) United States Patent
Kim et al.

(10) Patent No.: US 7,889,293 B2
(45) Date of Patent: Feb. 15, 2011

(54) DISPLAY DEVICE INCLUDING COLOR FILTERS

(75) Inventors: Yong-Jo Kim, Gwangmyeong-si (KR); Sang-Yong No, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 12/265,272

(22) Filed: Nov. 5, 2008

(65) Prior Publication Data

US 2009/0251631 A1 Oct. 8, 2009

(30) Foreign Application Priority Data

Apr. 7, 2008 (KR) ................ 10-2008-0032238

(51) Int. Cl.
*G02F 1/1335* (2006.01)
*G02F 1/136* (2006.01)

(52) U.S. Cl. ................ 349/106; 349/48; 349/108; 349/139

(58) Field of Classification Search .......... 349/41, 349/42, 43, 48, 104, 105, 106, 107, 108, 349/109, 139
See application file for complete search history.

(56) References Cited

U.S. PATENT DOCUMENTS

| 5,850,271 | A * | 12/1998 | Kim et al. ............... 349/111 |
| 7,042,538 | B2 * | 5/2006 | Chen ...................... 349/106 |
| 7,443,465 | B2 * | 10/2008 | Kim ....................... 349/106 |
| 7,474,368 | B2 * | 1/2009 | Cheng et al. .............. 349/114 |
| 2003/0043318 | A1 * | 3/2003 | Kim ....................... 349/106 |
| 2009/0225017 | A1 * | 9/2009 | Kim et al. .................. 345/88 |
| 2009/0251631 | A1 * | 10/2009 | Kim et al. .................. 349/48 |
| 2010/0002172 | A1 * | 1/2010 | Kim et al. ................. 349/106 |

FOREIGN PATENT DOCUMENTS

| JP | 2004245916 | 9/2004 | ............ 349/48 X |
| KR | 100502087 | 7/2005 | ............ 349/48 X |
| KR | 100552959 | 2/2006 | ............ 349/48 X |
| KR | 1020060114744 | 11/2006 | ............ 349/48 X |

\* cited by examiner

*Primary Examiner*—Brian M Healy
(74) *Attorney, Agent, or Firm*—H.C. Park & Associates, PLC

(57) ABSTRACT

A display device that is divided into a plurality of pixel regions including first, second, and third pixel regions includes a first color filter occupying the first pixel region and a second color filter occupying the second pixel region, which neighbors the first pixel region, and overlapping the first color filter. The first color filter is disposed on the second color filter in the overlapping region of the first color filter and the second color filter, and a central line of the overlapping region deviates from the boundary line between the first pixel region and the second pixel region.

26 Claims, 8 Drawing Sheets

US 7,889,293 B2

DISPLAY DEVICE INCLUDING COLOR FILTERS

CROSS-REFERENCE TO RELATED APPLICATION

This application claims priority from and the benefit of Korean Patent Application No. 10-2008-0032238, filed on Apr. 7, 2008, which is hereby incorporated by reference for all purposes as if fully set forth herein.

BACKGROUND OF THE INVENTION

1. Field of the Invention

The present invention relates to a display device, and particularly to a liquid crystal display including a color filter.

2. Discussion of the Background

The liquid crystal displays (LCD) is one of the most widely used flat panel displays and includes a pair of panels provided with field-generating electrodes, such as pixel electrodes and a common electrode, and a liquid crystal (LC) layer disposed between the two panels. The LCD displays images when voltages are applied to the field-generating electrodes to generate an electric field in the LC layer that determines the orientations of LC molecules therein to adjust polarization of incident light.

The liquid crystal display includes color filters to represent various colors. The color filters may be made of an organic material including pigments and are frequently formed on the display panel along with thin film transistors. Each color filter may represent a primary color such as red, green, or blue, and the neighboring color filters may overlap each other near their boundaries. However, when the color filters overlap each other, the height thereof may be increased at the overlapping region such that a cell gap, i.e., the thickness of the liquid crystal layer, at the overlapping region is different than in other places, and therefore the characteristics of the light passing through the overlapping region may be changed.

A black matrix generally covers the overlapping region of the color filters, but it may be difficult for the black matrix to cover all the light that is obliquely incident to the overlapping region. Accordingly, light leakage may not be completely eliminated even though the black matrix is used.

SUMMARY OF THE INVENTION

The present invention provides a display device that may reduce light leakage.

Additional features of the invention will be set forth in the description which follows, and in part will be apparent from the description, or may be learned by practice of the invention.

The present invention discloses a display device that is divided into a plurality of pixel regions including first, second, and third pixel regions. The display device includes a first color filter occupying the first pixel region, and a second color filter occupying the second pixel region, which neighbors the first pixel region, and overlapping the first color filter. The first color filter is disposed on the second color filter in an overlapping region of the first color filter and the second color filter, and a central line of the overlapping region deviates from a boundary line between the first pixel region and the second pixel region.

The present invention also discloses a display device that is divided into a plurality of pixel regions including first, second, and third pixel regions. The display device includes a first color filter occupying the first pixel region, a second color filter occupying the second pixel region, which neighbors the first pixel region, and overlapping the first color filter, a light blocking member covering the overlapping region of the first color filter and the second color filter, and a second light blocking member disposed opposite to the first light blocking member with respect to the center of the first color filter and the second color filter and adjacent to the overlapping region. The first color filter is disposed on the second color filter in the overlapping region of the first color filter and the second color filter. A majority of the first light blocking member is in the first pixel region, and a majority of the second light blocking member is in the second pixel region.

The present invention also discloses a display device including a first substrate, a gate line disposed on the first substrate, first, second, third, and fourth data lines disposed on the first substrate and insulated from the gate line and sequentially arranged, a first thin film transistor connected to the gate line and the first data line, a second thin film transistor connected to the gate line and the second data line, a third thin film transistor connected to the gate line and the third data line, a fourth thin film transistor connected to the gate line and the fourth data line, a first pixel electrode including a first sub-pixel electrode connected to the first thin film transistor and a second sub-pixel electrode connected to the second thin film transistor, a second pixel electrode including a third sub-pixel electrode connected to the third thin film transistor and a fourth sub-pixel electrode connected to the fourth thin film transistor, a first color filter overlapping the first pixel electrode, and a second color filter overlapping the second pixel electrode. The first color filter is disposed on the second color filter in the overlapping region of the first color filter and the second color filter, and a central line of the overlapping region deviates from the central point of the second data line and the third data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
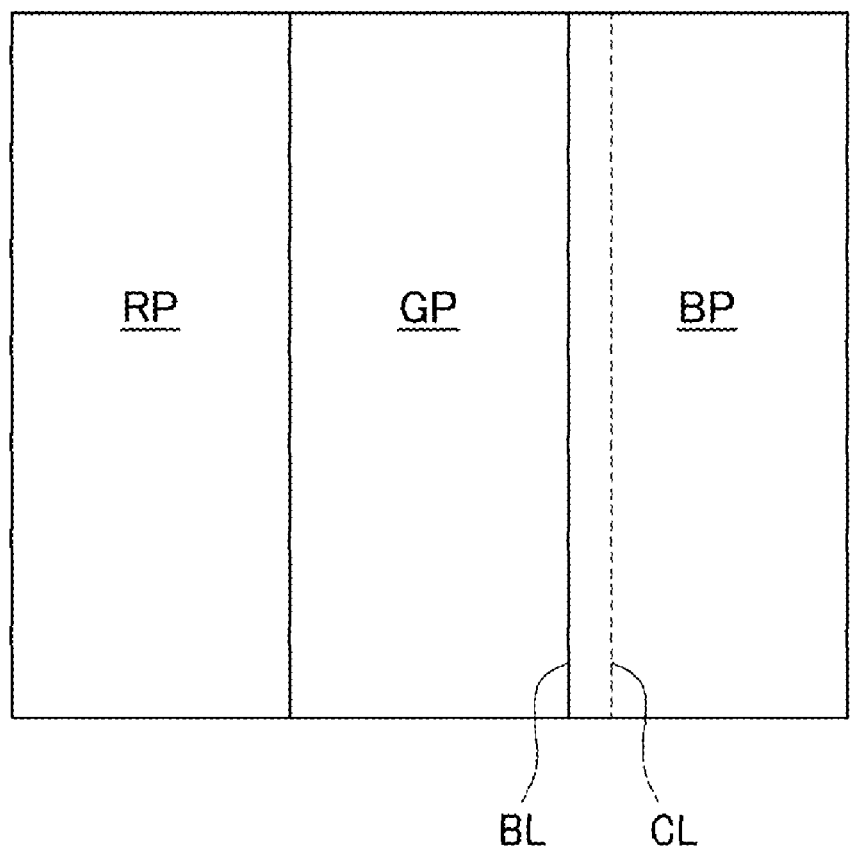
FIG. 1 is a schematic diagram of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A liquid crystal display according to an exemplary embodiment of the present invention will be described in detail below with reference to FIG. 1, FIG. 2, FIG. 3, FIG. 4, and FIG. 5.

FIG. 1 is a schematic diagram of a liquid crystal display according to an exemplary embodiment of the present invention, and FIG. 2, FIG. 3, FIG. 4, and FIG. 5 are cross-sectional views near boundaries between a green pixel region and a blue pixel region in the liquid crystal display shown in FIG. 1.

Referring to FIG. 1, a liquid crystal display according to the present exemplary embodiment is divided into a plurality of pixel regions RP, GP, and BP, and the pixel regions RP, GP, and BP are arranged in a matrix. Each pixel region RP, GP, and BP includes a switching element (not shown) such as a thin film transistor, and a liquid crystal capacitor (not shown). Each pixel region RP, GP, and BP uniquely displays a primary color, and a desired color may be recognized by a spatial or temporal sum of the primary colors. The primary color may be red, green, or blue, and a red pixel region RP, a green pixel region GP, and a blue pixel region BP may be sequentially arranged in a row direction.

Figure 2:
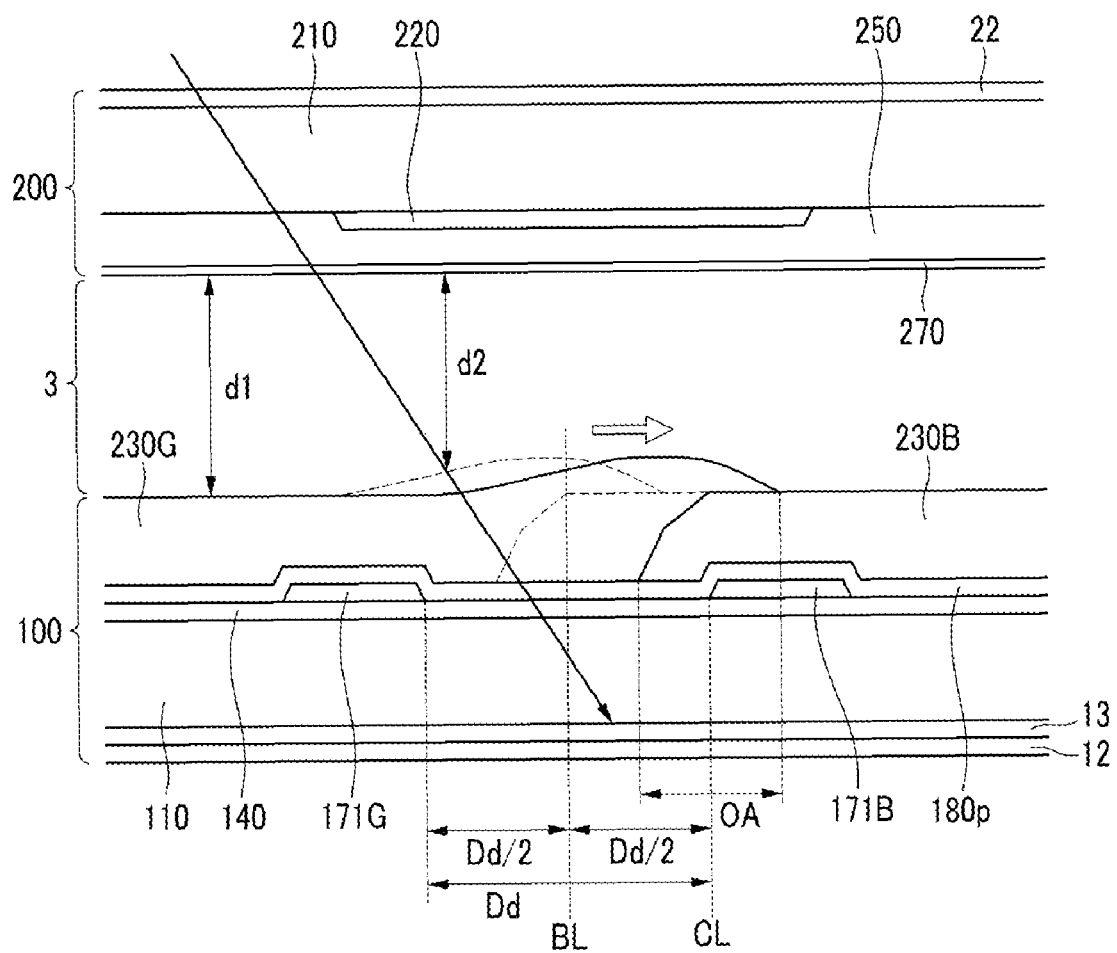
FIG. 2, FIG. 3, FIG. 4, and FIG. 5 are cross-sectional views near the boundaries between the green pixel region and the blue pixel region in the liquid crystal display shown in FIG. 1.
Figure 3:
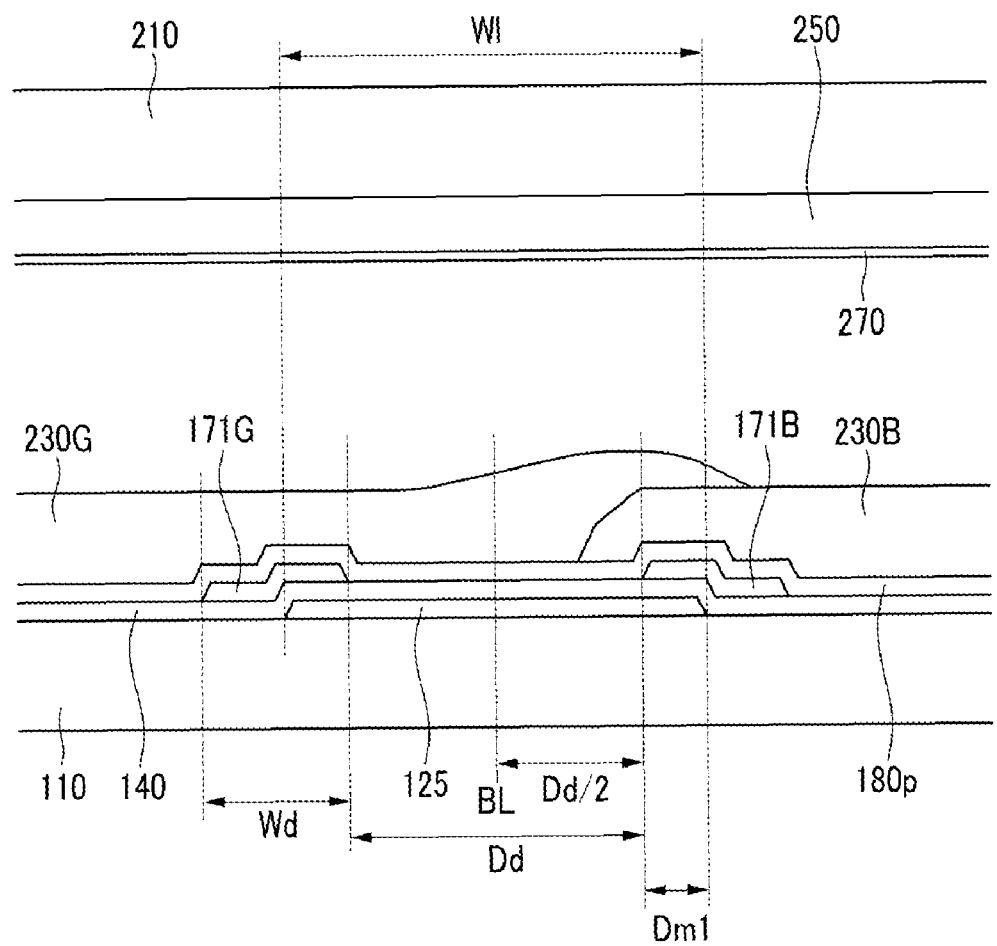
Figure 4:
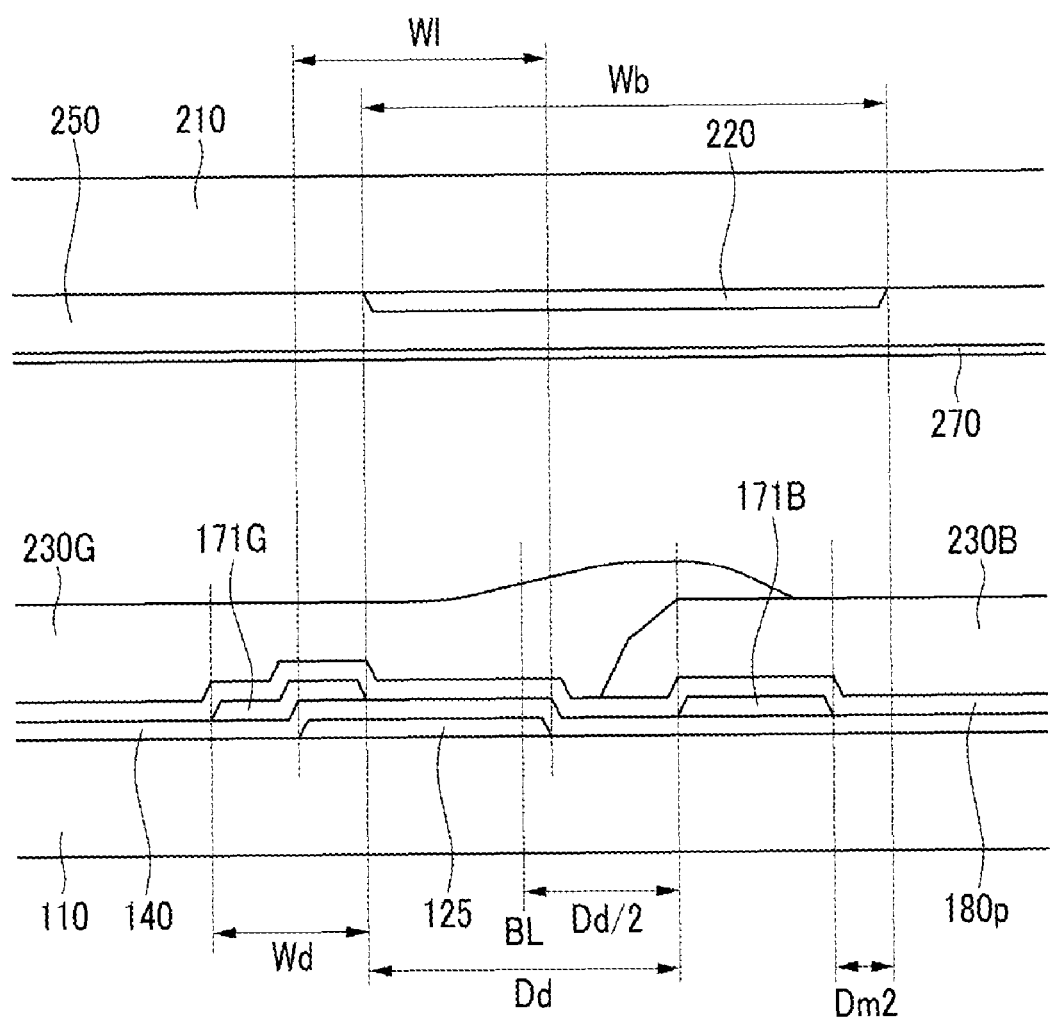

Referring to FIG. 2, FIG. 3, and FIG. 4, the liquid crystal display according to an exemplary embodiment of the present invention includes a thin film transistor array panel 100, a common electrode panel 200 facing the thin film transistor panel 100, and a liquid crystal layer 3 disposed between the two display panels 100 and 200.

The liquid crystal layer 3 may have negative dielectric anisotropy and may be aligned such that the longitudinal axes of the liquid crystal molecules in the liquid crystal layer 3 are almost perpendicular to the surfaces of the two display panels 100 and 200 in the absence of an electric field.

The common electrode panel 200 includes a substrate 210, a thin film structure formed on the inner surface of the substrate 210, and an optical structure attached on the outer surface of the substrate 210. The thin film structure includes an overcoat 250, a common electrode 270, and an alignment layer (not shown), which are sequentially formed on the inner surface of the substrate 210. The optical structure includes an upper polarizer 22 attached on the outer surface of the substrate 210.

The thin film transistor array panel 100 includes a substrate 110, a thin film structure formed on the inner surface of the substrate 110, and an optical structure attached on the outer surface of the substrate 110. The thin film structure includes gate lines (not shown), a gate insulating layer 140, data lines 171G and 171B, a passivation layer 180p, color filters 230G and 230B, pixel electrodes (not shown), and an alignment layer (not shown), which are sequentially formed on the inner surface of the substrate 110. The thin film structure further includes thin film transistors disposed between the substrate 110 and the passivation layer 180p. The optical structure includes a compensation film 13 and a lower polarizer 12, which are sequentially attached on the outer surface of the substrate 110.

The polarization axes of the lower polarizer 12 and the upper polarizer 22 may be substantially perpendicular to each other, and at least one of the polarizers 12 and 22 and the compensation film 13 may be omitted.

Figure 5:
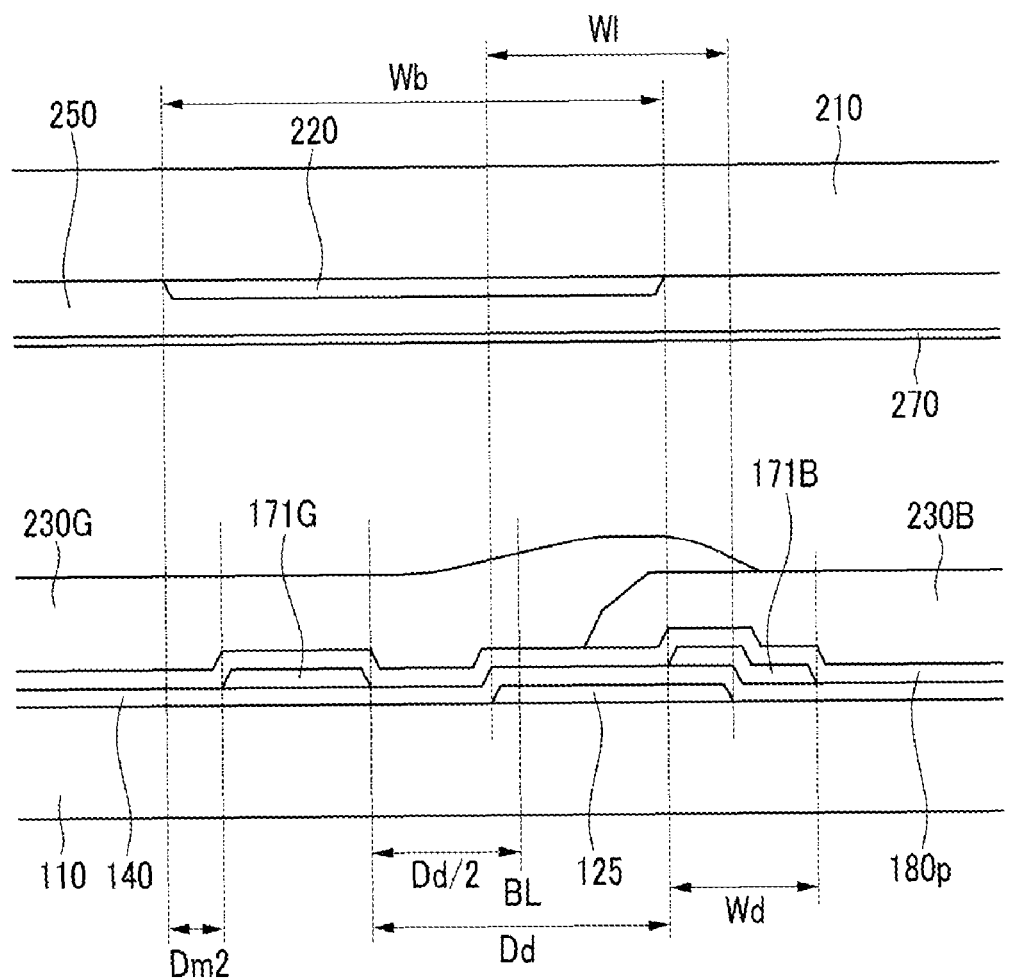

The thin film structure of the common electrode panel 200 shown in FIG. 2, FIG. 4, and FIG. 5 further includes an upper light blocking member 220 disposed between the substrate 210 and the overcoat 250. The thin film structure of the thin film transistor array panel 100 shown in FIG. 3, FIG. 4, and FIG. 5 further includes a lower light blocking member 125 disposed between the substrate 110 and the gate insulating layer 140. The upper light blocking member 220 may be an insulator, and the lower light blocking member 125 may be a conductor.

The gate insulating layer 140, the passivation layer 180p, and the common electrode 270 cover the entire surface of the substrates 110 and 210, and the gate lines, the data lines 171G and 171B, the thin film transistors, and the light blocking members 125 and 220 are disposed near the boundaries between the pixel regions RP, GP, and BP. The pixel electrodes and the color filters 230G and 230B occupy most of the pixel regions RP, GP, and BP, and are representatives of the pixel regions RP, GP, and BP. That is, the red pixel region RP includes a pixel electrode and the red color filter (not shown), the green pixel region GP includes a pixel electrode and the green color filter 230G, and the blue pixel region GP includes a pixel electrode and the blue color filter 230B.

The pixel electrodes are connected to the thin film transistors, and the thin film transistors are connected to the gate lines and to the data lines 171G and 171B. The pixel electrodes may include at least two sub-pixel electrodes that are spaced apart from each other, and each of the sub-pixel electrodes may be connected to its own thin film transistor. In this case, a pair of data lines 171G and 171B to apply the data voltages to the thin film transistors may be disposed on the left and right sides of each pixel electrode, respectively. In this structure, two data lines are arranged at respective sides of a boundary between two pixel regions RP, GP, and BP. For example, two data lines 171G and 171B may be located on respective sides of the boundary line BL of the green pixel region GP and the blue pixel region BP, and they may be substantially equidistant from the boundary line BL. That is, the shortest distance Dd between two data lines 171G and 171B may be twice each of the shortest distance from the boundary line BL to the data line 171G and the shortest distance from the boundary line BL to the data line 171B.

The color filters 230R, 230G, and 230B overlap each other near the boundary lines BL of the pixel regions RP, GP, and BP. The green color filter 230G overlaps the blue color filter 230B near the boundary line BL of the green pixel region GP and the blue pixel region BP, and all of or a majority of an overlapping area OA between the green color filter 230G and the blue color filter 230B may be located in the blue pixel region BP. In other words, a central line CL of the overlapping area OA of the green color filter 230G and the blue color filter 230B is positioned in the blue pixel region BP, and the maximum distance between the boundary line BL and the central line CL may be about half (Dd/2) of the shortest distance Dd between two data lines 171G and 171B or may be half of the width of the data line 171G and 171B added to the value Dd/2. Accordingly, for example, if the shortest distance Dd between two data lines 171G and 171B is 12 μm, the maximum distance between the boundary line BL and the central line CL may be 6 μm.

The height of a portion of the green color filter 230G disposed in the overlapping area OA is the greatest among all portions of the green color filter 230G, and a portion neighboring the overlapping area OA has a greater thickness than the other portions. Accordingly, the distance between the thin film transistor array panel 100 and the common electrode panel 200 near the overlapping area OA is smaller than in other regions, and accordingly the thickness of the liquid crystal layer 3, or a cell gap, is smaller near the overlapping area OA.

Referring to FIG. 2, the upper light blocking member 220 is symmetrical with respect to the boundary BL of the green color filter 230G and the blue color filter 230B, and overlaps the data lines 171G and 171B.

In the liquid crystal display with this structure, incident light that is perpendicular to the display panels 100 and 200 near the boundary of the pixel regions GP and BP is blocked by the upper light blocking member 220, but light that is obliquely incident thereto may not be blocked and pass through. For example, as shown by the long arrow in FIG. 2, light incident from the left side of the upper light blocking member 220 may leak out between two data lines 171G and 171B. However, when the overlapping area OA is disposed close to the blue pixel region BP, the cell gap of the liquid crystal layer 3 at a place where the incident light passes is almost the same as the cell gap d1 at the inner place of the green pixel region GP and thus the characteristics of the incident light may be almost the same as the characteristics of the light passing through the inner area of the green pixel region GP. However, as represented by the dotted lines, when the central line CL of the overlapping area OA is aligned with the boundary line BL, the cell gap d2 of the portion of the liquid crystal layer 3 where the incident light passes is smaller than the cell gap d1 at inner portions of the green pixel region GP such that the characteristics of the incident light is different from the characteristics of the light passing inside the green pixel region GP.

Particularly, the material of the green color filter 230G may include a low viscosity as compared with a material of a color filter of the other colors such that it is difficult to make it flat. Accordingly, the deviation of this cell gap may be increased. Also, when the compensation film 13 is optimized for the green light, which has the middle wavelength among red, green, and blue light, the deviation of the cell gap may greatly influence the light characteristics of the liquid crystal display. For example, when the liquid crystal layer 3 is vertically aligned and the polarization axes of the polarizers 12 and 22 are perpendicular to each other, a black state may be represented when there is no electric field. Here, the compensation film 13 may be set up such that the green light never passes through the liquid crystal display to completely exhaust the green light. In this case, the green light passing through a place having a cell gap different from most of the green pixel region GP may leak such that a greenish color may be represented. However, in exemplary embodiments of the present invention, the overlapping area OA of the green color filter 230G and the blue color filter 230B may be moved to the blue pixel region BP such that the cell gap of the region where the obliquely incident light passes may become uniform, thereby reducing the greenish color.

Referring to FIG. 3, the lower light blocking member 125 has a symmetrical structure with respect to the boundary line BL of the green pixel region GP and the blue pixel region BP, and overlaps the data lines 171G and 171B. The width WI of the light blocking member 125 may be substantially the same as the sum of the shortest distance Dd of the data lines 171G and 171B, and two times an error value Dm1 for interlayer alignment. Therefore, the region between the data lines 171G and 171B may be almost completely covered such that the upper light blocking member 220 may be omitted. Wd indicates the width of the data lines 171G and 171B. When the shortest distance Dd between the data lines 171G and 171B is 12 μm, the width Wd of the data lines 171G and 171B is 6 μm, and when the interlayer alignment error value Dm1 is 3 μm, the width WI of the lower light blocking member 125 may be about 18 μm. In the case of FIG. 2, the alignment error value between the display panels 100 and 200 must be considered, and if the alignment error value between the display panels 100 and 200 is 4 μm, the width of the upper light blocking member 220 may be about 32 μm.

The region between the data lines 171G and 171B may be not completely covered in the case of FIG. 2, and a parasitic capacitance between the lower light blocking member 125 and the data line 171G and 171B may be increased in the case of FIG. 3. Therefore, both the upper light blocking member 220 and the lower light blocking member 125 are provided and the merits of both members 220 and 125 may be obtained as shown in FIG. 4 and FIG. 5

In FIG. 4 and FIG. 5, the centers of the upper light blocking member 220 and the lower light blocking member 125 are formed on opposite sides of the boundary line BL. In the case of FIG. 4, the center of the upper light blocking member 220 is formed in the blue pixel region BP, and the center of the lower light blocking member 125 is formed in the green pixel region GP. To the contrary, in the case of FIG. 5, the center of the upper light blocking member 220 is formed in the green pixel region GP, and the center of the lower light blocking member 125 is formed in the blue pixel region BP.

The light blocking member 220 covers the region from the boundary BL of the green pixel region GP and the blue pixel region BP to one of the data lines 171B and 171G. Here, the width Wb and the position thereof is designed to cover from a position of the outer boundary of the corresponding data line 171B/171G by adding the alignment error value Dm2 to the inner boundary of the other of the data lines 171G and 171B while considering the obliquely incident light and the alignment error value Dm2 between the display panels 100 and 200. The lower light blocking member 125 covers a region opposite to the region covered by the upper light blocking member 220, and here the width WI and the position thereof are designed while considering the interlayer alignment error value Dm1.

As above-described, if the shortest distance Dd between the data lines 171G and 171B is 12 μm, the width Wd of the data lines 171G and 171B is 6 μm, the interlayer alignment error value Dm1 is 3 μm, and the alignment error Dm2 between the display panels 100 and 200 is 4 μm, the width WI of the lower light blocking member 125 may be about 12 μm, and the width of the upper light blocking member 220 may be about 22 μm.

Next, a liquid crystal display according to another exemplary embodiment of the present invention will be described with reference to FIG. 6, FIG. 7, and FIG. 8.

Figure 6:
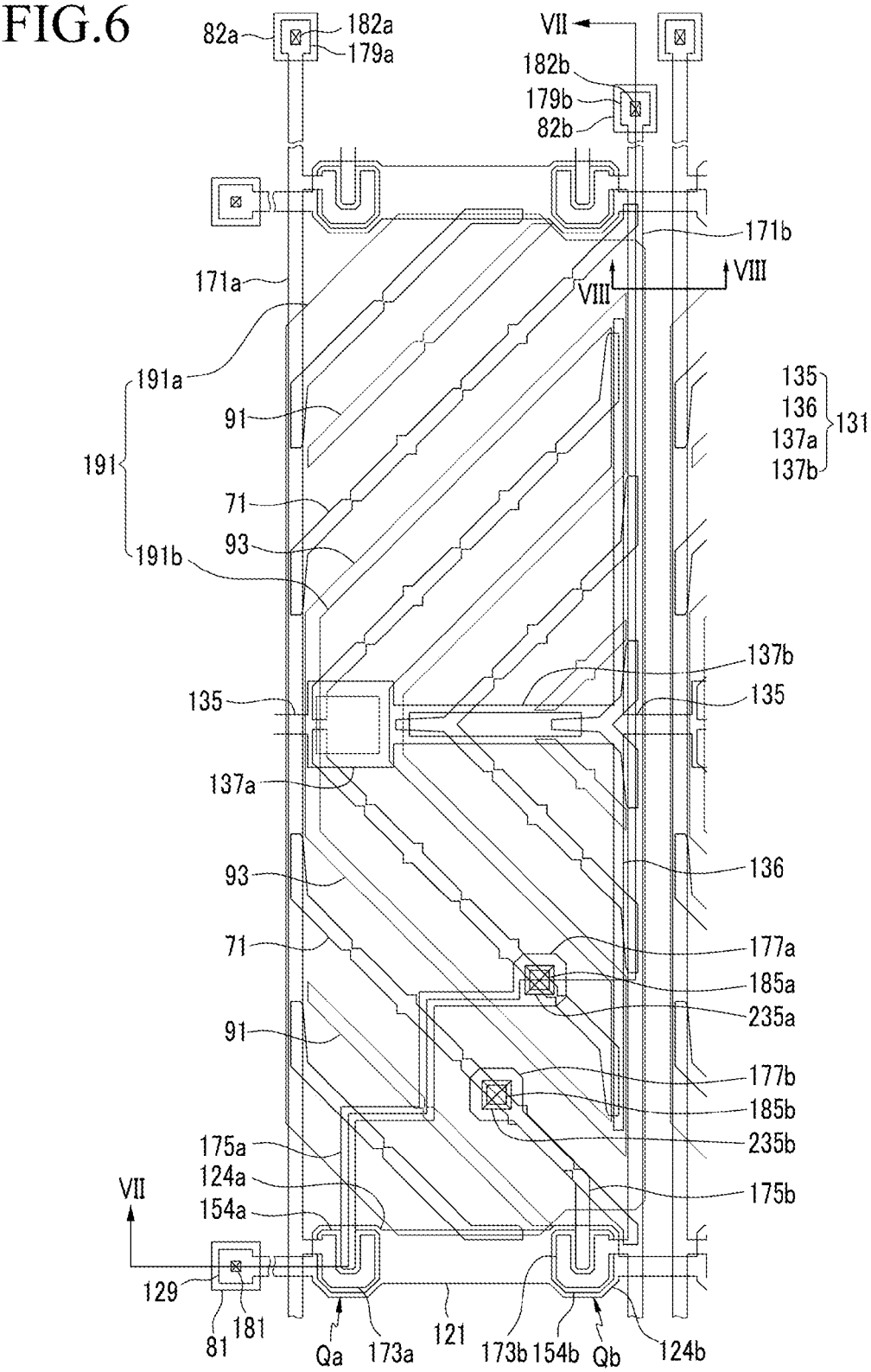
FIG. 6 is a layout view of a liquid crystal display according to another exemplary embodiment of the present invention.
Figure 7:
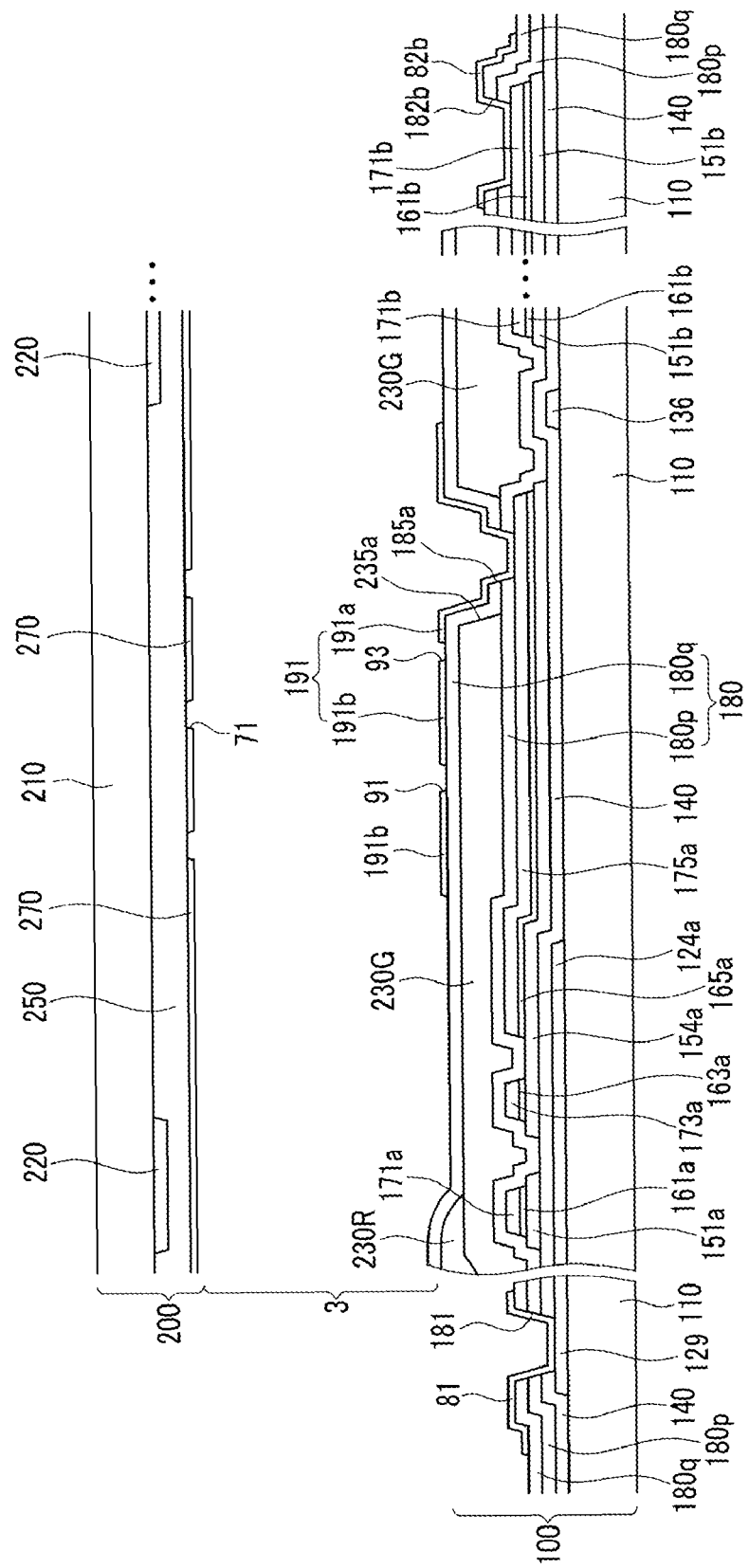
FIG. 7 is a cross-sectional view of the liquid crystal display shown in FIG. 6 taken along line VII-VII.
Figure 8:
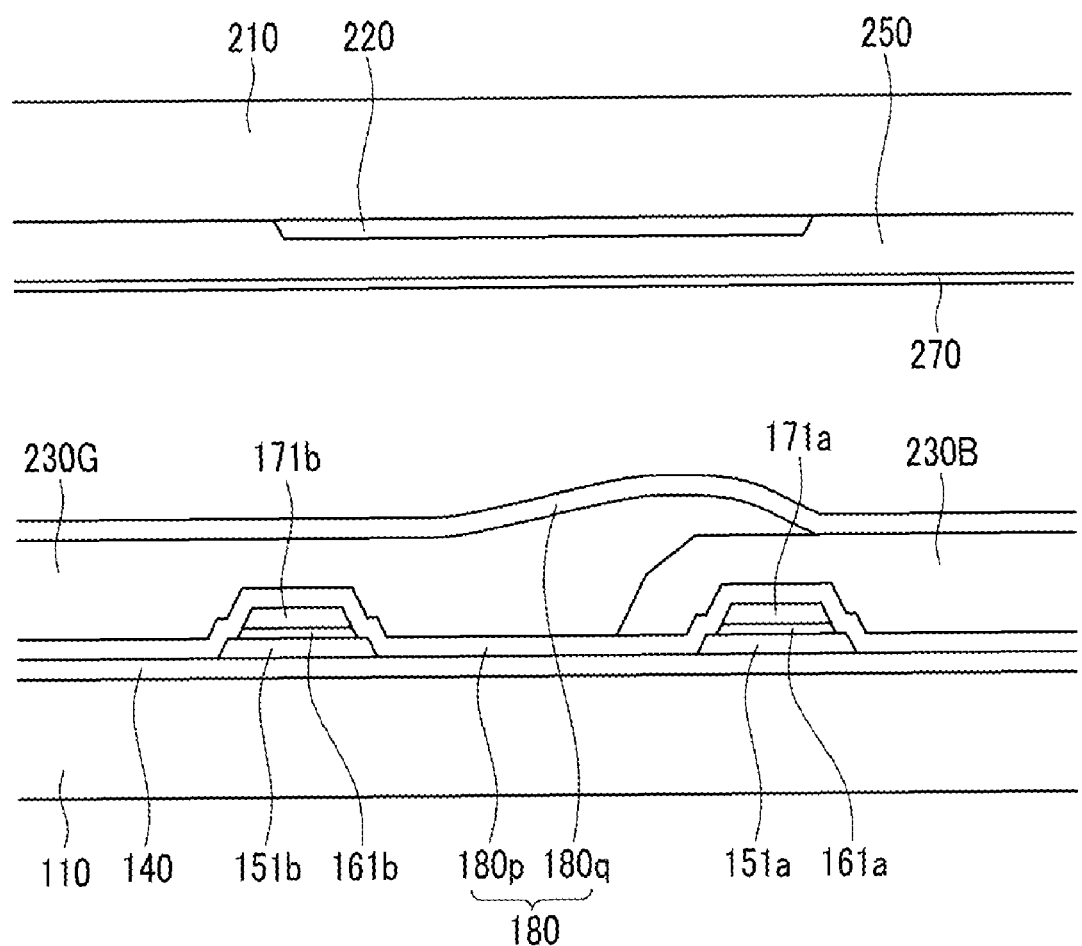
FIG. 8 is a cross-sectional view of the liquid crystal display shown in FIG. 6 taken along line VIII-VIII.

FIG. 6 is a layout view of a liquid crystal display according to another exemplary embodiment of the present invention, FIG. 7 is a cross-sectional view of the liquid crystal display shown in FIG. 6 taken along line VII-VII, and FIG. 8 is a cross-sectional view of the liquid crystal display shown in FIG. 6 taken along line VIII-VIII.

Referring to FIG. 6, FIG. 7, and FIG. 8, the liquid crystal display according to an exemplary embodiment of the present invention includes a thin film transistor array panel 100 and a common electrode panel 200 facing each other, and a liquid crystal layer 3 disposed between the two display panels 100 and 200.

The liquid crystal layer 3 may have negative dielectric anisotropy, and is oriented such that the longitudinal axes of the liquid crystal molecules of the liquid crystal layer 3 may be almost perpendicular to the surfaces of the two display panels 100 and 200 when no electric field is applied.

An alignment layer (not shown) may be formed on the inner surface of each display panel 100 and 200, and the alignment layers may be vertical alignment layers. A compensation film (not shown) and polarizers (not shown) may be provided on the outer surface of each display panel 100 and 200.

Firstly, the common electrode panel 200 will be described.

A light blocking member 220 is formed on an insulating substrate 210, which may be made of a transparent glass or plastic.

An overcoat 250 is formed on the substrate 210 and the light blocking member 220. The overcoat 250 may be made of an (organic) insulating material, and may be omitted.

A common electrode 270 is formed on the overcoat 250. The common electrode 270 is made of a transparent conductor such as ITO and IZO, and is applied with a common voltage. A plurality of cutouts 71 are formed in the common electrode 270. Each cutout 71 includes at least one oblique portion extending obliquely, and each oblique portion includes a plurality of concave or convex notches.

Next, the thin film transistor array panel 100 will be described.

A plurality of gate lines 121 and a plurality of storage electrode lines 131 are formed on an insulating substrate 110, which may be made of transparent glass or plastic.

The gate lines 121 extend substantially in a transverse direction and transmit gate signals. Each gate line 121 includes a plurality of first and second gate electrodes 124a and 124b protruding upward and downward, and an end portion 129 having a large area for contact with another layer or an external driving circuit.

The storage electrode lines 131 extend substantially parallel to the gate lines 121, and are supplied with a predetermined voltage. Each storage electrode line 131 is disposed between two neighboring gate lines 121 and nearly equidistant from the two neighboring gate lines 121. Each storage electrode line 131 includes a first storage electrode 137a, a second storage electrode 137b, a branch electrode 136, and a connection 135. The first and second storage electrodes 137a and 137b are approximately rectangular and are joined to each other. The transverse length of the first storage electrode 137a is shorter than that of the second storage electrode 137b, and the longitudinal length of the first storage electrode 137a is longer than that of the second storage electrode 137b. The branch electrode 136 is connected to an end of the second storage electrode 137b and extends in a longitudinal direction to approach the gate line 121. The transverse length of the branch electrode is very small. The connection 135 connects the branch electrode 136 to a neighboring first storage electrode 137a, and the longitudinal length thereof is small compared with the first and second storage electrodes 137a and 137b. However, the shapes and arrangement of the storage electrode lines 131 may be modified in various ways.

A gate insulating layer 140, which may be made of silicon nitride ($SiN_x$) or silicon oxide ($SiO_x$), is formed on the gate lines 121 and the storage electrode lines 131.

A plurality of first semiconductor stripes 151a and second semiconductor stripes 151b, which may be made of hydrogenated amorphous silicon (simply referred to as a-Si) or polysilicon, are formed on the gate insulating layer 140. The first semiconductor stripes 151a are disposed at the left side of the first storage electrode 137a, extend in the longitudinal direction, and include a plurality of protrusions 154a extending upward the first gate electrode 124a with a wide area, curved in the longitudinal and transverse directions, and extending toward the second storage electrode 137b. The second semiconductor stripes 151b are disposed in the right side of the second storage electrode 137b, extend in the longitudinal direction, and include a plurality of protrusions 154b extending upward the second gate electrodes 124b with a wide area, again shortly extending, and extending in the oblique direction.

A pair of first ohmic contact stripes 161a and islands 165a are formed on the first semiconductor stripes 151a, and a pair of second ohmic contact stripes 161b and islands (not shown) are formed on the second semiconductor stripes 151b. The first ohmic contact stripes 161a include protrusions 163a facing the first ohmic contact islands 165a on the first gate electrodes 124a, and the second ohmic contact stripes 161b include protrusions (not shown) facing the second ohmic contact islands 165b on the second gate electrodes 124b. The ohmic contacts 161a, 161b, and 165a may be formed of n+ hydrogenated amorphous silicon heavily doped with an n-type impurity, or they may be made of silicide.

A plurality of first and second data lines 171a and 171b, and a plurality of first and second drain electrodes 175a and 175b are formed on the ohmic contacts 161a, 161b, and 165a and the gate insulating layer 140.

The first and second data lines 171a and 171b transmit data voltages, and extend substantially in the longitudinal direction to cross the gate lines 121 and the connections 136 of the storage electrode lines 131. The first data line 171a includes a first source electrode 173a extending toward the first gate electrode 124a and curved like a character "U", and an end portion 179a having a wide area for contact with another layer or an external driving circuit. Likewise, the second data line 171b includes a second source electrode 173b extending toward the second gate electrode 124b and curved like a character "U", and an end portion 179b having a wide area for contact with another layer or an external driving circuit.

The drain electrodes 175a and 175b are spaced apart from the data lines 171a and 171b. One end portion of the first drain electrode 175a is partly enclosed by the source electrode 173a and the other end portion has a wide area 177a. The first drain electrode 175a alternately extends in the longitudinal direction and in the transverse direction. One end portion of the second drain electrode 175b is partly enclosed by the source electrode 173b and the other end portion has a wide area 177b. The second drain electrode 175b extends upward and is curved in the oblique direction.

The first/second gate electrode 124a/124b, the first/second source electrode 173a/173b, and the first/second drain electrode 175a/175b along with the protrusion of the first/second semiconductor stripe 151a/151b form a first/second thin film transistor Qa/Qb (TFT) having a channel formed in the first/second semiconductor stripe 151a/151b disposed between the first/second source electrode 173a/173b and the first/second drain electrode 175a/175b.

The ohmic contacts 161a, 161b, and 165a are disposed only between the underlying semiconductor stripes 151a and 151b, and the overlying data lines 171a and 171b and drain electrodes 175a and 175b, and reduce contact resistance between them. The semiconductor stripes 151a and 151b have substantially the same plane shape as the data lines 171a and 171b, the drain electrodes 175a and 175b, and the ohmic contacts 161a, 161b, and 165a thereunder. However, the semiconductor stripes 151a and 151b include some exposed portions that are not covered with the data lines 171a and 171b and the drain electrodes 175a and 175b, such as portions located between the source electrodes 173a and 173b and the drain electrodes 175a and 175b.

A passivation layer 180 is formed on the data lines 171a and 171b, the drain electrodes 175a and 175b, and the exposed semiconductor stripes 151a and 151b. The passivation layer 180 includes a lower layer 180p made of an inorganic insulator such as silicon nitride or silicon oxide, and an upper layer 180q. At least one of the lower layer 180p and the upper layer 180q may be omitted.

The passivation layer 180 has a plurality of contact holes 182a and 182b respectively exposing the end portions 179a and 179b of the data lines 171a and 171b, and a plurality of contact holes 185a and 185b respectively exposing the wide end portions 177a and 177b of the drain electrodes 175a and 175b. The passivation layer 180 and the gate insulating layer 140 have a plurality of contact holes 181 exposing the end portions 129 of the gate lines 121.

A plurality of color filters 230R, 230G, and 230B are formed between the lower film 180p and the upper film 180q. The color filters 230R, 230G, and 230B are disposed between the first data lines 171a and the second data lines 171b, and may be elongated in a longitudinal direction to form a stripe. Two neighboring color filters overlap each other, and the central line of the overlapping area of the green color filter 230G and the blue color filter 230B tends to the side of the first data line 171a from the neighboring first data line 171a and second data line 171b. The color filters 230R, 230G, and 230B may be made of a photosensitive organic material including pigments.

The color filters 230R, 230G, and 230B have a plurality of through holes 235a and 235b passing through the contact holes 185a and 185b that are larger than the contact holes 185a and 185b. The color filters 230R, 230G, and 230B have a first opening 237a disposed on the first storage electrode 137a with a rectangular shape, and a second opening 237b disposed on the second storage electrode 137b with a rectangular shape. The color filters 230R, 230G, and 230B exist in a peripheral region where the end portions 129, 179a, and 179b of the gate line 121 and the data line 171a and 171b are formed.

A plurality of pixel electrodes 191 and a plurality of contact assistants 81, 82a, and 82b are formed on the upper layer 180q of the passivation layer 180. The pixel electrodes 191 and the contact assistants 81, 82a and 82b may be made of a transparent conductive material such as ITO or IZO, or a reflective metal such as aluminum, silver, chromium, or alloys thereof.

The contact assistants 81, 82a, and 82b are connected to the end portions 129 of the gate lines 121 and the end portions 179a and 179b of the data lines 171 through the contact holes 181, 182a, and 182b, respectively. The contact assistants 81, 82a, and 82b protect the end portions 129, 179a, and 179b and enhance the adhesion of the end portions 129, 179a, and 179b and external devices.

Each pixel electrode 191 has an approximately rectangular shape having four main edges nearly parallel to the gate lines 121 or the data lines 171a and 171b, as well as chamfered left corners. The chamfered edges of the pixel electrodes 191 make an angle of about 45 degrees with the gate lines 121.

Each pixel electrode 191 includes a first sub-pixel electrode 191a and a second sub-pixel electrode 191b that is larger than the first sub-pixel electrode 191a.

The first sub-pixel electrode 191a has a band shape of an approximate less-than sign (<), and is enclosed by the second sub-pixel electrode 191b via a gap 93 disposed therebetween. The second sub-pixel electrode 191b has a plurality of cutouts 91 with a straight band shape, and the cutouts 91 make an angle of about 45 degrees with the gate lines 121 and the data lines 171a and 171b. The gaps 93 includes a plurality of oblique portions substantially parallel to the cutouts 91, and a plurality of longitudinal portions substantially parallel to the data lines 171a and 171b. The cutouts 91 and the gaps 93 are alternately arranged with the cutouts 71 of the common electrode 270.

The first sub-pixel electrode 191a overlaps the first storage electrode 137a near the first opening 237a to form a storage capacitor. The second sun-pixel electrode 191b overlaps the second storage electrode 137b near the second opening 237b to form a storage capacitor.

The first/second sub-pixel electrode 191a/191b is connected to the first/second drain electrode 175a/175b of the first/second thin film transistor through the contact hole 185a/185b to receive data voltages from the first/second drain electrode 175a/175b. The first/second sub-pixel electrode 191a/191b generates an electric field along with the common electrode 270 of the common electrode panel 200, which determine the orientations of the liquid crystal molecules of the liquid crystal layer 3 disposed between the electrodes 191a/191b and 270. Accordingly, the luminance of the light transmitted through the liquid crystal layer 3 differs depending on the determined orientation of the liquid crystal molecules.

The first thin film transistor Qa and the first sub-pixel electrode 191a, and the liquid crystal layer 3, the common electrode 270, and the polarizer that are disposed thereon, form a unit to display one luminance point that is referred to as a first sub-pixel hereinafter. The second thin film transistor Qb and the second sub-pixel electrode 191b, and the liquid crystal layer 3, the common electrode 270, and the polarizer that are disposed thereon, also form a unit to display one luminance point that is referred to as a second sub-pixel hereinafter. The first sub-pixel and the second sub-pixel are combined to represent one effective luminance point, and they can be considered to be one pixel for this reason.

The luminance presented by one pixel is determined by image information supplied from an external device (not shown), and the image information is processed in a controller (not shown) in the liquid crystal display and converted into voltages to be applied to the first sub-pixel electrode 191a and the second sub-pixel electrode 191b. The voltages are determined such that the luminance average of the first sub-pixel and the second sub-pixel is substantially the same as the luminance represented by the image information.

The luminance of the first sub-pixel is higher than the luminance of the second sub-pixel, and the voltage applied to the first sub-pixel electrode 191a is higher than the voltage applied to the second sub-pixel electrode 191b with reference to the common voltage in the case of a normally black mode.

The first/second sub-pixel electrode 191a/191b and the common electrode 270 form a first/second liquid crystal capacitor to maintain an applied voltage even after the TFT is turned off.

The polarization axes of two polarizers are crossed and form angles of approximately 45° with the cutouts.

The structure of the cross-section of FIG. 3, FIG. 4, and FIG. 5 may be applied to the present exemplary embodiment, and the lower light blocking member 125 may be formed on the same layer as the gate lines 121.

Accordingly, the central lines of overlapping areas of the color filters are arranged away from the boundary lines of the pixel regions such that the light leakage generated due to the height difference of the color filters by the overlapping of the color filters may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device that is divided into a plurality of pixel regions comprising a first pixel region, a second pixel region, and a third pixel region, the display device comprising:
   a first color filter occupying the first pixel region; and
   a second color filter occupying the second pixel region, which neighbors the first pixel region, and overlapping the first color filter,
   wherein the first color filter is disposed on the second color filter in an overlapping area of the first color filter and the second color filter, and
   a central line of the overlapping area deviates from a boundary line between the first pixel region and the second pixel region.

2. The display device of claim 1, wherein:
   the central line of the overlapping area deviates from the boundary line between the first pixel region and the second pixel region by a distance of less than 6 μm.

3. The display device of claim 1, wherein:
   the height of the first color filter at the overlapping area is greater than at other areas.

4. The display device of claim 3, wherein:
   the thickness of the first color filter in a region adjacent to the overlapping area is greater than at other regions.

5. The display device of claim 4, wherein:
   the central line of the overlapping area is located in the second pixel region.

6. The display device of claim 5, further comprising:
   a third color filter occupying the third pixel region, which neighbors the first pixel region,
   wherein a wavelength of a first color represented by the first color filter is between a wavelength of the second color represented by the second color filter and a wavelength of the third color represented by the third color filter.

7. The display device of claim 6, wherein:
   the first color is green, the second color is blue, and the third color is red.

8. The display device of claim 1, further comprising:
   a light blocking member covering the overlapping area.

9. The display device of claim 8, wherein:
   the light blocking member is symmetrically arranged with respect to the boundary line between the first pixel region and the second pixel region.

10. The display device of claim 1, further comprising:
    a first light blocking member, at least a portion of the first light blocking member being arranged in the overlapping region; and
    a second light blocking member disposed opposite to the first light blocking member with respect to the first color filter and the second color filter, and at least a portion of the second light blocking member being arranged in the overlapping region.

11. The display device of claim 10, wherein:
    the first light blocking member is located in the first pixel region and the second pixel region, a majority of the first light blocking member being arranged in the first pixel region; and
    the second light blocking member is located in the first pixel region and the second pixel region, a majority of the second light blocking member being arranged in the second pixel region.

12. A display device divided into a plurality of pixel regions comprising a first pixel region, a second pixel region, and a third pixel region, the display device comprising:
    a first color filter occupying the first pixel region;
    a second color filter occupying the second pixel region, which neighbors the first pixel region, and overlapping the first color filter;
    a first light blocking member covering an overlapping area of the first color filter and the second color filter; and
    a second light blocking member disposed opposite to the first light blocking member with respect to the first color filter and the second color filter and adjacent to the overlapping area,
    wherein the first color filter is disposed on the second color filter in the overlapping area,
    a majority of the first light blocking member is located in the first pixel region, and
    a majority of the second light blocking member is located in the second pixel region.

13. The display of claim 12, wherein:
    the first color is green and the second color is blue.

14. A display device, comprising:
    a first substrate;
    a gate line disposed on the first substrate;
    a first data line, a second data line, a third data line, and a fourth data line disposed on the first substrate, insulated from the gate line, and sequentially arranged;
    a first thin film transistor connected to the gate line and the first data line;
    a second thin film transistor connected to the gate line and the second data line;
    a third thin film transistor connected to the gate line and the third data line;
    a fourth thin film transistor connected to the gate line and the fourth data line;
    a first pixel electrode comprising a first sub-pixel electrode connected to the first thin film transistor and a second sub-pixel electrode connected to the second thin film transistor;
    a second pixel electrode comprising a third sub-pixel electrode connected to the third thin film transistor and a fourth sub-pixel electrode connected to the fourth thin film transistor;
    a first color filter overlapping the first pixel electrode; and
    a second color filter overlapping the second pixel electrode,
    wherein the first color filter is disposed on the second color filter in an overlapping area of the first color filter and the second color filter, and
    a central line of the overlapping area deviates from the midpoint between the second data line and the third data line.

15. The display device of claim 14, wherein:
    the height of the first color filter at the overlapping area is greater than at other areas.

16. The display device of claim 15, wherein:
    the thickness of the first color filter in a region adjacent to the overlapping area is greater than at other regions.

17. The display device of claim 16, wherein:
    the central line of the overlapping area is located in the second pixel region.

18. The display device of claim 17, wherein:
    the first color is green and the second color is blue.

19. The display device of claim 18, further comprising:
    a second substrate facing the first substrate;
    a common electrode disposed on the second substrate;
    a vertically aligned liquid crystal layer disposed between the first substrate and the second substrate;

a first polarizer attached to the first substrate;

a second polarizer attached to the second substrate and having a polarization axis crossing a polarization axis of the first polarizer; and a compensation film attached to the first substrate and optimized at green light.

20. The display device of claim 14, further comprising:

a gate insulating layer disposed between the gate line and the data line; and a first light blocking member disposed between the first substrate and the gate insulating layer and covering an area between the second data line and the third data line.

21. The display device of claim 20, wherein:

the first light blocking member is symmetrical about the midpoint between the second data line and the third data line.

22. The display device of claim 20, further comprising:

a second substrate facing the first substrate;

a common electrode disposed on the second substrate; and a second light blocking member disposed on the second substrate and covering an area between the second data line and the third data line.

23. The display device of claim 22, wherein:

a center of the first light blocking member is located closer to the first pixel electrode than to the midpoint between the second data line and the third data line; and a center of the second light blocking member is located closer to the second pixel electrode than to the midpoint between the second data line and the third data line.

24. The display device of claim 22, wherein:

a center of the first light blocking member is located closer to the second pixel electrode than to the midpoint between the second data line and the third data line; and a center of the second light blocking member is located closer to the first pixel electrode than to the midpoint between the second data line and the third data line.

25. The display device of claim 14, further comprising:

a second substrate facing the first substrate;

a common electrode disposed on the second substrate; and a light blocking member disposed on the second substrate and covering an area between the second data line and the third data line.

26. The display device of claim 25, wherein:

the light blocking member is symmetrical about the midpoint between the second data line and the third data line.

\* \* \* \* \*